United States Patent [19]

Walker

[11] Patent Number: 4,883,405
[45] Date of Patent: Nov. 28, 1989

[54] TURBINE NOZZLE MOUNTING ARRANGEMENT

[75] Inventor: Alan Walker, Wyoming, Ohio

[73] Assignee: The United States of America as represented by the Secretary of the Air Force, Washington, D.C.

[21] Appl. No.: 122,142

[22] Filed: Nov. 13, 1987

[51] Int. Cl.⁴ .............................................. F01D 9/04
[52] U.S. Cl. ..................................... 415/137; 415/189
[58] Field of Search ............... 415/136, 137, 138, 139, 415/189, 190, 191, 216, 217, 218; 403/315, 317; 411/517

[56] References Cited

U.S. PATENT DOCUMENTS

| | | | |
|---|---|---|---|
| 2,609,176 | 9/1952 | Purvis | 415/217 |
| 2,819,817 | 1/1958 | McVeigh | 415/216 |
| 3,028,141 | 4/1962 | Nichols | 415/137 |
| 3,062,499 | 11/1962 | Peterson | 415/137 |
| 3,066,911 | 12/1962 | Anderson et al. | 415/189 |
| 3,340,760 | 9/1967 | Wormser | 411/517 X |
| 3,423,071 | 1/1969 | Noren | 415/189 |
| 3,610,777 | 10/1971 | Wagle | 416/198 |
| 3,765,791 | 10/1973 | Trappmann | 415/131 |
| 3,970,318 | 7/1976 | Tuley | 277/26 |
| 3,997,275 | 12/1976 | Mitchell | 403/315 X |
| 4,274,805 | 6/1981 | Holmes | 415/138 |
| 4,314,793 | 2/1982 | De Tolla et al. | 415/135 |
| 4,318,668 | 3/1982 | Chaplin et al. | 415/135 |
| 4,391,565 | 7/1983 | Speak | 415/189 |
| 4,566,851 | 1/1986 | Comeau et al. | 415/139 |
| 4,688,378 | 8/1987 | Harris | 415/138 X |

FOREIGN PATENT DOCUMENTS

| | | | |
|---|---|---|---|
| 52-68612 | 6/1977 | Japan | 415/137 |
| 831412 | 3/1960 | United Kingdom | 415/138 |

Primary Examiner—Edward K. Look
Assistant Examiner—Joseph M. Pitko
Attorney, Agent, or Firm—Jules J. Morris; Donald J. Singer

[57] ABSTRACT

The invention comprises a turbine nozzle and nozzle support assembly in which a turbine nozzle support seating flange is positioned adjacent to a turbine nozzle mounting flange and pins are used to affix the turbine nozzle to the nozzle support. Retainer strips are installed into the nozzle support to trap the pins in engagement with the mounting and seating flanges. In the preferred embodiment of the invention seal means is provided for restricting the airflow through the completed turbine nozzle and nozzle support assembly.

14 Claims, 4 Drawing Sheets

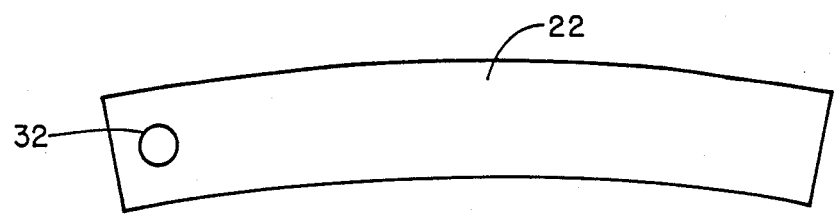
FIG. 2
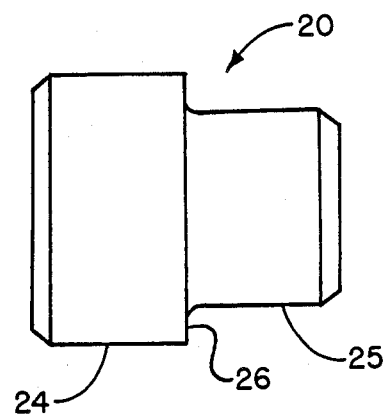
FIG. 3
FIG. 4

TURBINE NOZZLE MOUNTING ARRANGEMENT

STATEMENT OF GOVERNMENT INTEREST

The invention described herein may be manufactured and used by or for the Government for governmental purposes without the payment of any royalty thereon.

TECHNICAL FIELD

This invention pertains to gas turbine engines and is specifically related to mounting arrangements for high pressure turbine nozzles.

BACKGROUND

The high pressure turbine nozzle of a gas turbine engine performs an aerodynamic function in that it accelerates and directs the hot gas flow from the combustor into the high pressure turbine rotor. As such, the turbine nozzle experiences large pressure loads across it due to the reduction in static pressure between inlet and exit planes. It also is exposed to high thermal gradients resulting from exposure to the hot gases of the engine flowpath and the cooling air used to prevent overheating of the turbine structures.

The support structure of the turbine nozzle reacts to the pressure loads at the inner and outer flowpath diameters. The loads are transferred out of the turbine structure through the cold structures into the engine casings and frame.

Turbine nozzles are typically constructed of nozzle segments having paired vanes. At the inner structural interface of the turbine nozzle, the nozzle segments are often attached to the inner support structure by a bolt or a combination of bolts and a clamping arrangement. The outer flowpath interface, which is normally combined with a turbine shroud support, uses no mechanical retention, but relies on the pressure load across the nozzle to maintain contact and seat the nozzle with the outer support structure. It is important, for reasons of good engine performance, that the inner and outer interfaces provide good air seals. The pressure drop across these interfaces is of similar magnitude to that across the turbine nozzle itself. Any air leaking across the interfaces will not have been accelerated to the turbine nozzle hot gas exit stream velocity and is therefore a chargeable performance loss to the turbine engine. Modern gas turbine engines make use of seals at these locations to allow relative axial motion of the inner and outer structures while maintaining air seals which provide minimal leakage across the inner and outer nozzle interfaces.

There are several problems in executing all of the above required features. Current designs produce relatively complex nozzle assemblies that require unacceptable amounts of time to assemble and disassemble. Installation and replacement of turbine nozzles substantially contributes to engine maintenance time requirements. Further, the air seal arrangements in such assemblies are often difficult to install and to inspect. In the competitive aircraft engine market it is important to ease the maintainability requirements for hot section structures such as turbine nozzle that need periodic inspection and replacement.

A need therefore exists for an improved mounting arrangement that provides for easy assembly and disassembly of the turbine nozzle in order to ease turbine engine maintenance.

Turbine nozzles are subject to very high temperatures that in modern engines can be in the range of 2000° F. In order to extend the life of turbine hardware, cooling air is provided to such hardware in order to prevent its overheating from exposure to hot engine gases. Higher operating temperatures in today's most efficient engines require improved cooling to prevent overheating and damage to turbine hardware. As a result, a need exists for a turbine nozzle mounting arrangement that provides improved turbine nozzle cooling.

SUMMARY OF THE INVENTION

The invention comprises a turbine nozzle and nozzle support assembly in which a turbine nozzle support seating flange is positioned adjacent to a turbine nozzle mounting flange and pins are used to affix the turbine nozzle to the nozzle support. Retainer strips are installed into the nozzle support to trap the pins in engagement with the mounting and seating flanges. In the preferred embodiment of the invention seal means is provided for restricting the airflow through the completed turbine nozzle and nozzle support assembly.

In a preferred embodiment of the invention, the pins are characterized by a shoulder which engages the nozzle support in order to prevent the pins from passing through. In an alternate preferred embodiment of the invention, straight pins are provided which are locked in position by retainer strips and baffles. The baffles assemble adjacent to the pins, the nozzle and the nozzle support. A chordal seal is provided between the nozzle and the nozzle support to restrict airflow therethrough.

In a preferred embodiment of the invention, the retainer strips are preferably annular segments that are slid into retainer flanges formed in the nozzle support and the turbine nozzle. The retainer strips preferably have antirotation means for preventing uncontrolled movement of the retainer flanges as well as key means to provide for easy retainer strips removal.

BRIEF DESCRIPTION OF THE DRAWINGS

The foregoing and other objects and advantages of the invention will be apparent from the following more particular description of the preferred embodiments of the invention, as illustrated in the accompanying drawings, in which like reference characters refer to the same parts throughout the different views. The drawings are not necessarily to scale, emphasis instead being placed upon illustrating the principles of the invention.

FIG. 2 is a plan view of a retainer strip used in the mounting arrangement of FIG. 1;

FIG. 3 is a side view of a portion of the retainer of FIG. 2;

FIG. 4 is a side view of the attachment pin used in the mounting arrangement of FIG. 1;

DETAILED DESCRIPTION OF THE INVENTION

Figure 1:
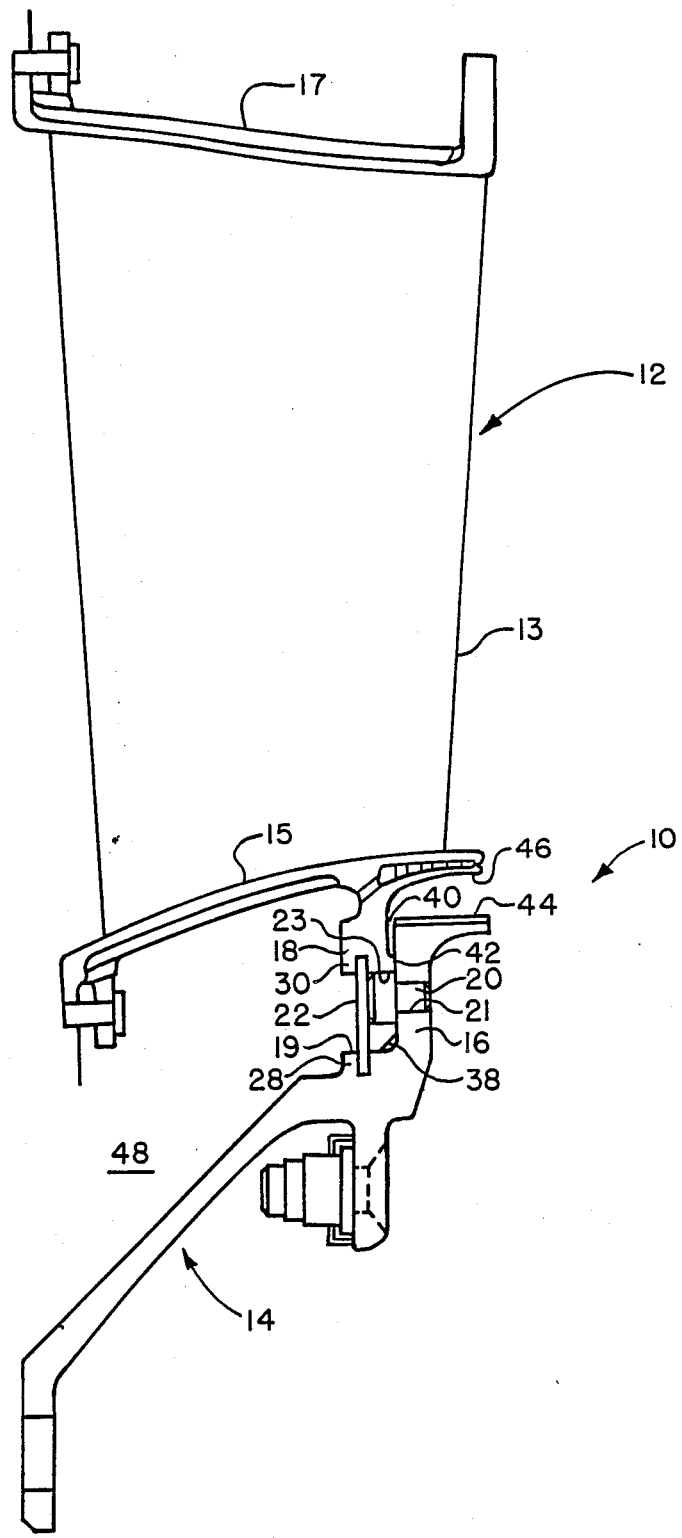
FIG. 1 is a cross-sectional view showing a turbine nozzle mounting arrangement which embodies the principles of this invention.

FIG. 1 is a cross-section of a turbine nozzle mounting arrangement 10 that embodies the principles of this invention. Turbine nozzle segments 12 are shown assembled to a nozzle support 14 having a support flange 16. The nozzle segment 12 has a mounting flange 18 which interfaces with the nozzle support flange 16. A boltless attachment system is provided which uses attachment pins 20 and pin retainers 22 to mount the nozzle 12 to the support 14.

The nozzle support 14 is firmly affixed to the inner structure of the gas turbine engine. The nozzle support comprises a nozzle seat 19 and a mounting flange 16 for retaining flange 18 of nozzle 12. The nozzle support mounting flange has a series of pin attachment holes 21.

Turbine nozzles typically comprise nozzle segments having paired vanes 13. An inner band 15 and outer band 17 define the engine air flowpath. During assembly, the nozzle segments are positioned onto the nozzle support flange 16. The attachment pins 20 are then pushed through large holes 23 in the nozzle mounting flange 18 and into small holes 21 of the nozzle support. The attachment pins 20 are also shown in the enlarged view Of FIG. 4. The pins comprise a small diameter nozzle support penetrating section 25 and a large diameter nozzle mounting section 24. A shoulder 26 is thus formed between sections 24 and 25. This shoulder seats on the reduced diameter hole 21 of the nozzle support flange 16 in order to prevent the pin from passing completely through the support flange 16.

Each nozzle segment is preferably held by two pins. One pin is held in the nozzle by a tight fit, the other pin is slightly loose. In operation, the nozzle band is therefore free to thermally expand slightly relative to the nozzle support through the operation of the loose pin hole. The nozzle is still retained radially at the loose pin location by a partial rabbit engagement onto the nozzle support flange. This allows for some differential thermal growth between the two structures without bending or warpage. After each nozzle segment is assembled to the support flange a sheet metal retainer strip 22 (FIG. 1) is installed to trap the pin between the retainer and the support flange. FIGS. 2 and 3 show enlarged views of the retainer 22. The retainer 22 is seated into a retention flange 28 formed on the nozzle support and a similar retention flange 30 formed on the nozzle mounting flange. The retainer is slid into slots formed by these flanges in order to trap the pins.

Figure 7:
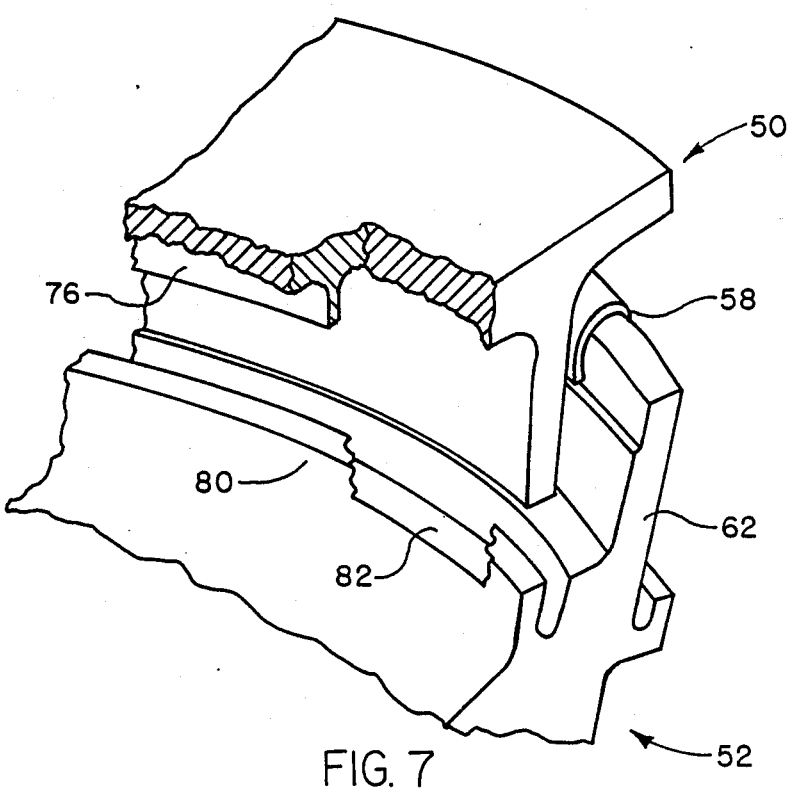
FIG. 7 is a partially broken away perspective view of the assembly of FIG. 5.

Each of the retainer retention flanges 28, 30 is relieved in a small section of the engine circumference to permit assembly of the last retainer after assembling all the nozzle segments to the nozzle support. A relief section similar to that required for this embodiment is shown and will be discussed with reference to FIG. 7 below.

FIG. 2 shows that the retainers preferably comprise annular segments with a key hole 32 for interface with a removal tool which aids disassembly of the nozzle segments from the support flange. In addition, one or several dimples 34 are provided on the last retainer strip segment as a means of interlocking the retainer strips with the nozzle support in order to prevent uncontrolled movement or slippage of the retainers due to engine vibration.

The nozzle 12 is subject to a pressure gradient across it due to the acceleration of the engine airflow through the vanes 13 that make up the nozzle. In addition, there is some relative axial motion between the inner and outer structures of the engine during engine operation that is due to thermal growth differences. In order to accommodate these engine characteristics the nozzle segments 12 are allowed to rock axially to a small degree on their support flange. Small axial clearances are therefore provided at locations 38 and 40 to allow some axial motion while avoiding significant mechanical loading of the retainer strips 22. A chordal seal 42 is provided on the nozzle mounting flange 18 to prevent uncontrolled airflow through the mounting assembly. The chordal seal comprises straight line chords running along the nozzle segments at the position shown (42) which sealingly interface the nozzle support. A similar chordal seal is shown and discussed in reference to FIG. 6.

A rotor interface flange 44 provides a clean aerodynamic interface with the blade angel wing of the following rotating turbine stage. This interface with the following turbine rotor stage discourages hot gas intrusion from the flowpath that might otherwise degrade nozzle and turbine support members. This boltless assembly allows placement of the mounting flanges closer to the following turbine rotor stage and reduces the length of the band overhang 46. This is accomplished by the elimination of the nuts and boltheads from nozzle assembly interface which would require additional axial room. Moving the mounting flanges further aft (to the right) improves turbine nozzle cooling since it reduces the length of the cooling path between the turbine nozzle and cooling air cavity 48. Since nozzle segment cooling s improved, it is expected that the useable lifetime of this part will be extended. Since the assembly of the nozzle to the support structure is achieved without the use of nuts or bolts, maintainability of the turbine nozzle is also vastly improved. Valuable assembly time is saved since this turbine nozzle assembly can be retained as a complete subassembly attached to a nozzle support. We estimate that a 50% reduction in assembly and disassembly times should be possible with this invention as compared to conventional bolted turbine nozzles.

Figure 5:
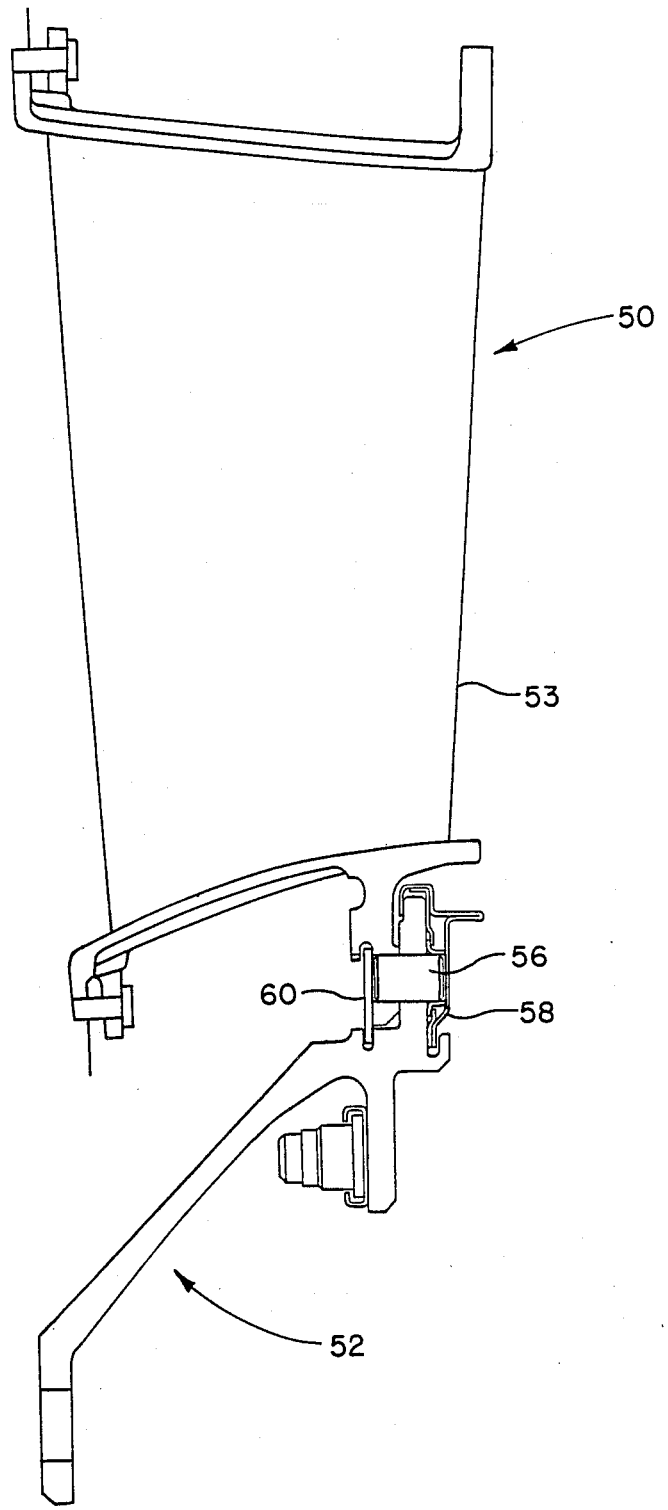
FIG. 5 is a cross-sectional view of another preferred turbine nozzle mounting arrangement which embodies the principles of this invention.

FIG. 5 is a cross-section of an alternate preferred nozzle attachment design that shares many of the advantages of the above detailed embodiment. In this embodiment, nozzle segments 50 are positioned on a nozzle support 52. As before, each of the nozzle segments preferably comprises paired vanes 53. In this embodiment cylindrical attachment pins 56 are used to assemble the nozzle to the support and the pins are trapped between a baffle 58 and a strip retainer 60. The assembly arrangement can be more readily understood with reference to the enlarged view of FIG. 6.

The nozzle support 52 comprises a support flange 62 to which is assembled a nozzle mounting flange 64. Initially a quantity of sheet metal baffles 58 equal to the number of nozzle segments is loaded onto the nozzle support flange 62. These baffles engage a retention flange 66 (formed on the nozzle support) and the top most section 68 of the support flange 62. The baffles also form a rotor interface and have a rotor interface flange 70 for aerodynamic engagement with the angel wings of the blades of the following turbine stage. The baffle thereby protects the nozzle support from hot gases which might otherwise circulate down from the engine flowpath. In addition, a very clean interface is provided with the rotor stage. Baffles 58 are of minimal height in order to reduce the thermal gradient across the baffle and thereby reduce distress in the parts. This enhances low cycle fatigue life of the baffles 58. After the baffles have been assembled to the nozzle support, attachment pins 56 are pushed through the nozzle support flange 62 to radially and axially locate the baffle 58. The pins are inserted into blind holes 72 formed in the baffles. Each baffle is provided with two blind holes 72 to mate with two pins; one pin provides both tangential and radial positioning, while the other pin only provides radial positioning. This is accomplished by making one of the blind holes either slightly elongated or slotted. This degree of tangential freedom is permitted to prevent warping since the baffles can operate 200°-300° F. hotter than the nozzle support. The baffles may therefore undergo greater thermal expansion than the nozzle or nozzle support.

After all the pins are installed in the nozzle support and baffles, the nozzle segments are loaded onto the pinned support one by one. As each nozzle segment is assembled to the pinned support flange 62 a sheet metal retainer strip 60 is installed tangentially into the nozzle segment and nozzle support. Retainers 60 are identical to retainers 22 of FIG. 2. Slot 74 in the nozzle support and similar slot 78 in the nozzle segment capture the retainers 60 in a position adjacent to pins 56. The last nozzle must be loaded onto the nozzle support without the pins installed as segment split lines are typically angled with respect to the engine's centerline, this precludes loading of the last segment axially. When the last nozzle segment is positioned, its two pins are installed and then the final retainer strip is slid into its grooves. This is accomplished by locally relieving flange 80 where the strip is fed in to permit assembly. This local relief portion 82 is shown in the perspective view of FIG. 7. The nozzle support likewise must have a similar relief section at flange 76 to allow this final retainer strip to be installed.

A chordal seal 84 is provided for reducing air flow through the assembly but will allow axially rocking of the nozzle 50 on its support flange 62 in order to accommodate relative axial growth of the inner and outer support structures. A minimum axial clearance of about one hundredth of an inch is provided at locations 86 and 87 in order to avoid significant loading of the retainer strips 60.

Figure 6:
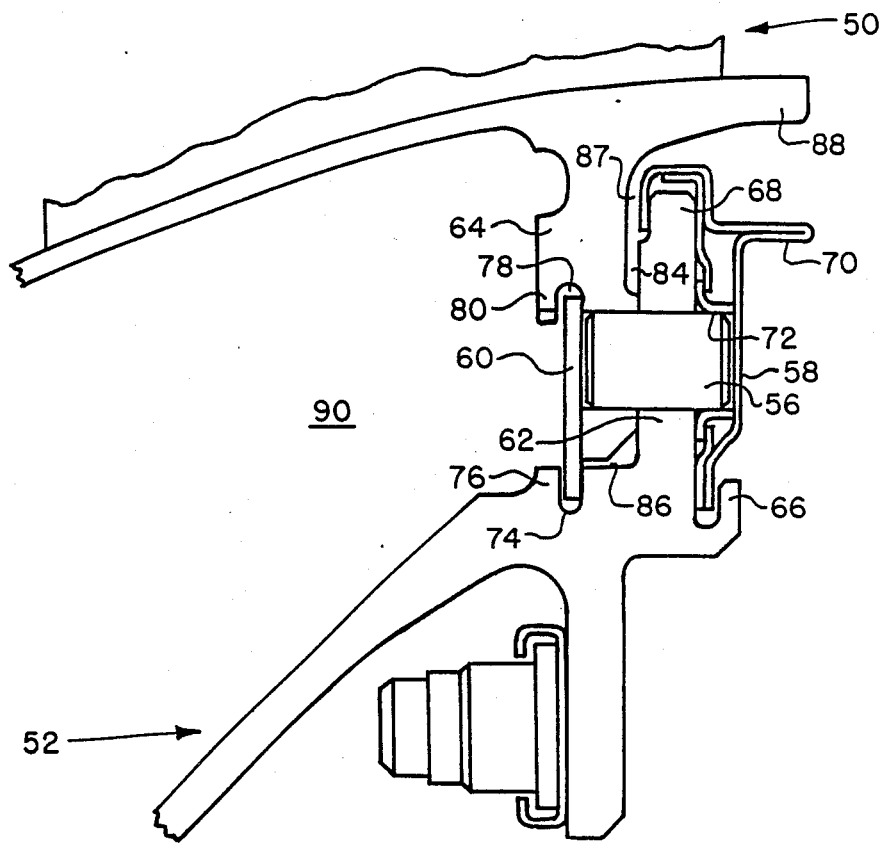
FIG. 6 is an enlarged cross-sectional view of the mounting arrangement of FIG. 5.

In both of the above embodiments the turbine nozzle is assembled to its support structure without the use of nuts and bolts. This results in a great reduction in both assembly and disassembly times as compared to bolted designs. Elimination of the bolted nozzle interface joint places the mounting assembly closer to the turbine rotor and thereby reduces the length of nozzle innerband overhang. In the view of FIG. 6 the innerband overhang is identified with numeral 88. This improves turbine nozzle cooling since it reduces the portion of the turbine nozzle separated from cooling air in cavity 90. Since nozzle segment cooling is improved, it is expected that the useable lifetime of this part will be extended.

In both above embodiments, the turbine nozzle can be retained as complete subassembly attached to the nozzle support. This contrast with most conventional turbine nozzle assemblies that require removal of the individual segments with engine disassembly. Availability of completed nozzle subassemblies speeds nozzle replacement during engine overhauls.

While the invention has been particularly described with reference to the preferred embodiments thereof, it will be understood by those skilled in the art that various changes in substance and form can be made therein without having departed from the spirit and the scope of the invention as detailed in the attached claims.

I claim:

1. A turbine nozzle and nozzle support assembly comprising:
   a turbine nozzle mounting flange affixed to the turbine nozzle;
   a nozzle seating flange forming a part of the nozzle support, said nozzle seating flange supporting the turbine nozzle at said mounting flange;
   pins engaging said turbine nozzle mounting flange and said nozzle support in order to affix said turbine nozzle to said nozzle support at said nozzle seating flange; and
   retainer strips engaging said pins and said nozzle support in order to maintain said pins in engagement with said turbine nozzle mounting flange and said nozzle support, said retaining strips being held within a retention flange of said nozzle support.

2. The turbine nozzle and nozzle support assembly of claim 1 wherein the assembly further comprises baffles for retaining said pins in said nozzle support and protecting said assembly from hot turbine gases.

3. The turbine nozzle and nozzle support assembly of claim 5 wherein said baffles engage said nozzle seating flange, said pins and a retaining flange on said nozzle support.

4. A nozzle flange attachment assembly comprising:
   (a) a turbine nozzle having an attachment flange including a series of nozzle pin holes;
   (b) a turbine nozzle support comprising:
       (i) a nozzle support flange for support said turbine nozzle,
       (ii) a series of support flange pin holes, and
       (iii) a retainer slot;
   (c) attachment pins for connecting said turbine nozzle attachment flange to said turbine nozzle support; and
   (d) retainer means comprising retainer strips placed in said retainer slot for retaining said pins in said pin holes.

5. The nozzle flange attachment assembly of claim 4 wherein said retainer means further comprises baffles adjacent to said pins for retaining said pins in said nozzle support and preventing flow of hot turbine gases into said attachment assembly.

6. The nozzle flange attachment assembly of claim 5 wherein said baffles engage said nozzle support flange, said pins and a retaining flange on said nozzle support.

7. The nozzle flange attachment assembly of claim 4 further comprising seal means for restricting airflow through the assembly.

8. The nozzle flange attachment assembly of claim 7 wherein said seal means comprises a chordal seal between said turbine nozzle mounting flange and said nozzle support flange.

9. The nozzle flange attachment assembly of claim 4 wherein said pins further comprise a shoulder for engagement with said nozzle support in order to prevent the pins from passing through said nozzle support.

10. The nozzle flange attachment assembly of claim 4 wherein said turbine nozzle further comprises a retention flange for holding said retaining strips adjacent to said pins.

11. The nozzle flange attachment assembly of claim 4 wherein said retainer strips are positioned by a first strip retainer flange on said nozzle support and a second strip retainer flange on said turbine nozzle.

12. The nozzle flange attachment assembly of claim 4 wherein said retainer strips further comprise antirotation means for preventing uncontrolled movement of said retainer strips.

13. The nozzle flange attachment assembly of claim 4 wherein said turbine nozzle support flange is shaped as a rotor interface to prevent hot gases from flowing into said attachment assembly.

14. A turbine nozzle and nozzle support assembly comprising:
- a turbine nozzle mounting flange affixed to the turbine nozzle;
- a nozzle seating flange forming a part of the nozzle support, said nozzle seating flange supporting the turbine nozzle at said mounting flange;
- pins engaging said turbine nozzle mounting flange and said nozzle support in order to affix said turbine nozzle to said nozzle support at said nozzle seating flange; and
- retainer strips engaging said pins and said nozzle support in order to maintain said pins in engagement with said turbine nozzle mounting flange and said nozzle support, said retainer strips being positioned by a first strip retainer flange on said nozzle support and a second strip retainer flange on said turbine nozzle.

* * * * *